United States Patent [19]

Ito

[11] 3,903,534

[45] Sept. 2, 1975

[54] SHUTTER CONTROL DEVICE FOR A CAMERA

[75] Inventor: Tadashi Ito, Yokohama, Japan

[73] Assignee: Canon Kabushiki Kaisha, Tokyo, Japan

[22] Filed: Mar. 11, 1974

[21] Appl. No.: 450,214

Related U.S. Application Data

[63] Continuation of Ser. No. 316,993, Dec. 20, 1972, which is a continuation of Ser. No. 247,905, April 26, 1972, which is a continuation of Ser. No. 29,500, April 17, 1970.

[30] Foreign Application Priority Data

| | | |
|---|---|---|
| Apr. 21, 1969 | Japan | 44-30843 |
| June 17, 1969 | Japan | 44-47739 |
| June 28, 1969 | Japan | 44-51739 |
| June 28, 1969 | Japan | 44-61649 |

[52] U.S. Cl. .................. 354/173; 354/234

[51] Int. Cl. .................. G03b 17/42

[58] Field of Search .................. 354/51, 234, 173

[56] References Cited

UNITED STATES PATENTS

| | | | |
|---|---|---|---|
| 3,135,181 | 6/1964 | Gevatter | 354/234 |
| 3,429,244 | 2/1969 | Wasielewski | 354/51 |

*Primary Examiner*—Samuel S. Matthews
*Assistant Examiner*—Russell E. Adams, Jr.
*Attorney, Agent, or Firm*—Toren, McGeady and Stanger

[57] ABSTRACT

In the device disclosed, a shutter actuating disc, after it has rotated through an almost full cycle, releases a coaxial shutter cocking disc which is connected to a rotating film-winding mechanism, and sets a pawl that stops the actuating disc. A shutter release, when unactuated, sets a release pawl that holds back the actuating disc. When the cocking disc is fully rotated it sets the stop pawl back so only the release pawl holds the actuator disc. A spring between the disc causes the rotating cocking disc to bias the actuating disc against the pawls. Pressing the shutter release pulls back the release pawl and allows the actuator disc to rotate, actuate the shutter, and release the cocking disc until it is stopped by the stop pawl. The cocking disc then rotates to wind the spring, and after a revolution sets back the stop pawl. If the shutter release is still pressed the stop pawl allows the actuator to start rotating for a succeeding picture. According to another embodiment of the invention, electrical means substitute for the release pawl and serve, in response to rotation of the actuating disc, to operate a motor that rotates the cocking disc.

19 Claims, 13 Drawing Figures

INVENTOR.

TADASHI ITO

BY McGlew & Toren

ATTORNEYS

INVENTOR.
TADASHI ITO
BY McGlew & Toren
ATTORNEYS

INVENTOR.

TADASHI ITO

BY McGlew & Toren

ATTORNEYS

INVENTOR.
TADASHI ITO
BY McGlew & Toren
ATTORNEYS

INVENTOR.

TADASHI ITO

BY McGlew & Toren

ATTORNEYS

SHUTTER CONTROL DEVICE FOR A CAMERA

This is a continuation of application Ser. No. 316,993, filed Dec. 20, 1972, which in turn is a continuation of application Ser. No. 247,905, filed on April 26, 1972, which in turn is a continuation of application Ser. No. 29,500, filed on Apr. 17, 1970.

The present invention relates to a shutter control device in a camera, and more particularly relates to a shutter control device with a rotary mechanism particularly useful in an automatic wind-up type camera.

In many conventional camera shutters are operated by a reciprocating mechanism. The operation of such a mechanism is complicated and undue forces working on camera parts make it difficult to operate the shutter successively. Hence continuous and successive photography is rather difficult.

The present invention intends to solve the above difficulty with the rotating mechanism by preventing an undue shock from affecting camera parts and so as to attain successive shutter operation for continuous and successive photography.

The present invention will be described with reference to the embodiments shown in the attached drawings in which.

Figure 4:
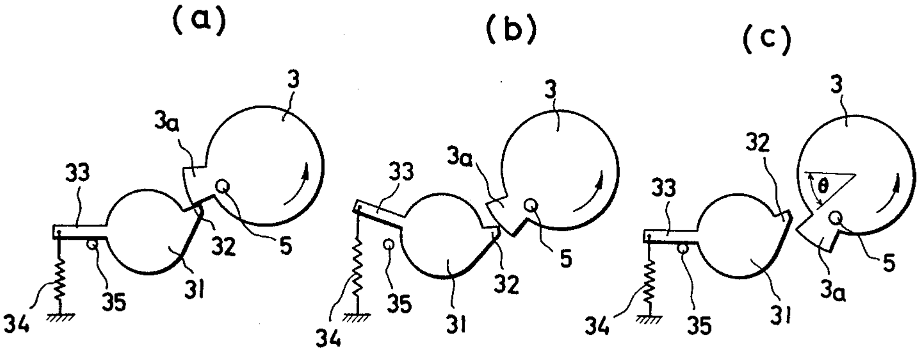

FIG. 4 (*a*) (*b*) (*c*) show respectively the release member in an initial state of release at the beginning of engagement with a delay device, in a state of release during engagement with the delay device, and in a state of release after disengagement from the delay device.

Figure 5:
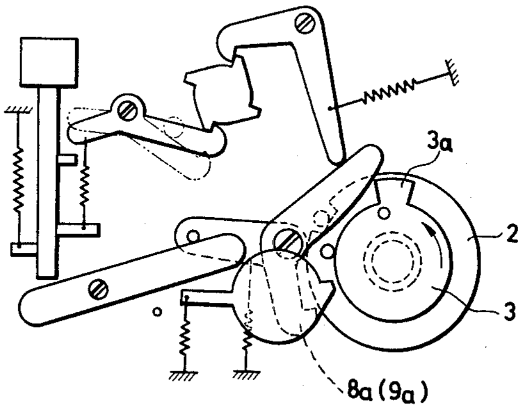
Figure 6:
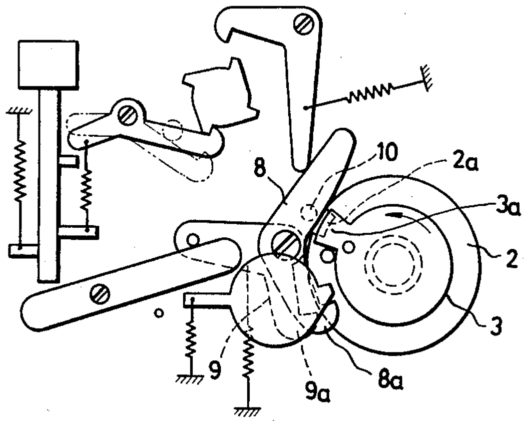

FIG. 5 is a front elevation of the device during release, and FIG. 6 is a front elevation of the device at the end of release.

Figure 7:
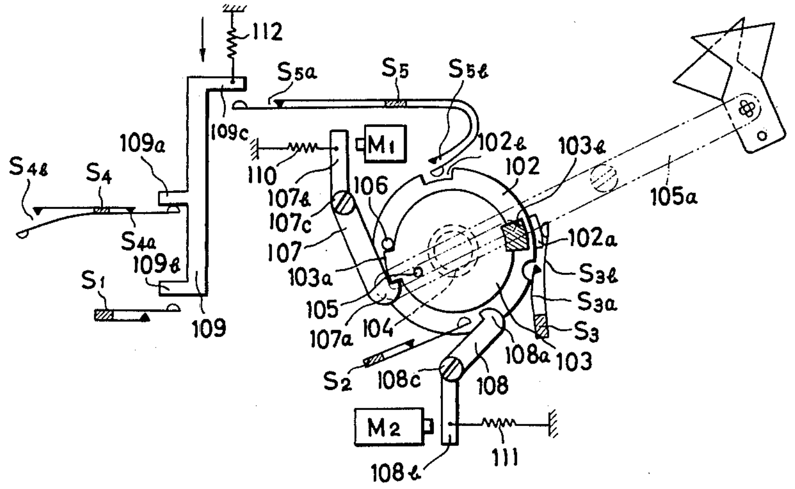
Figure 8:
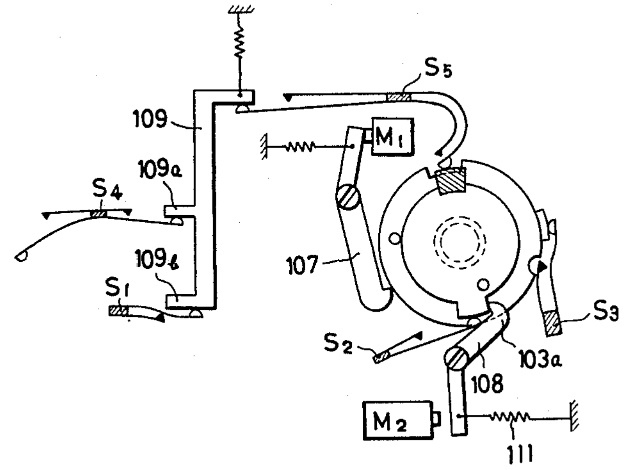
Figure 9:
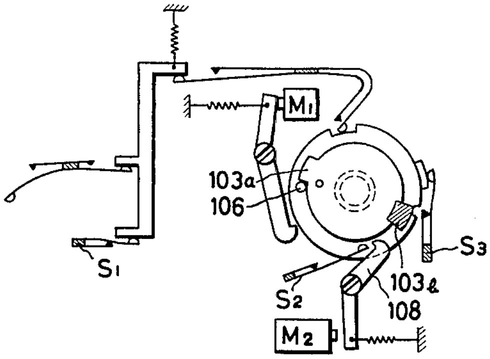
Figure 10:
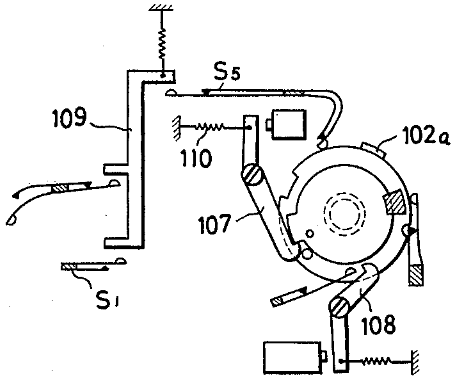

FIG. 7 is a front view of another embodiment of the device according to the present invention. FIG. 8 and FIG. 9 are front views of the device shown in FIG. 7 with a full open shutter and with a closed shutter respectively and FIG. 10 shows the device in while charging.

Figure 11:
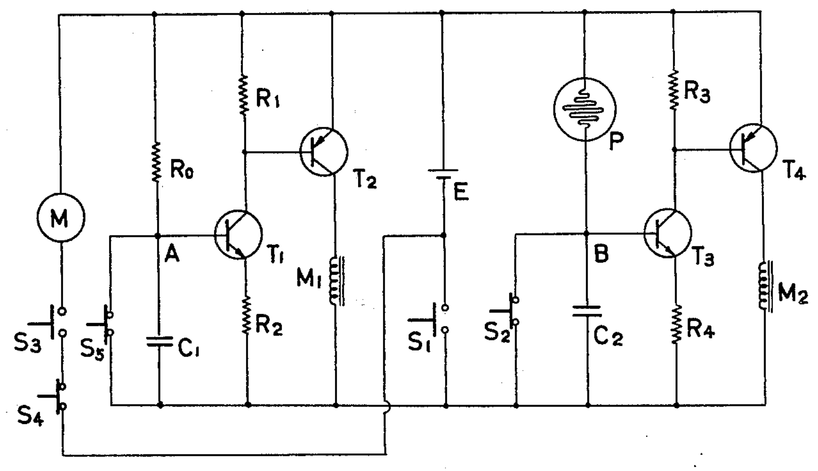

FIG. 11 is a circuit suitable for the device shown in FIGS. 7, 8, 9 and 10.

Figure 12:
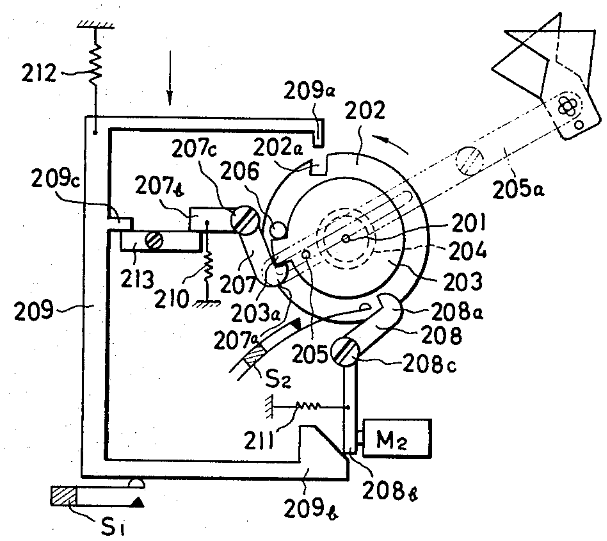

FIG. 12 is a front view of modification of the device according to the present invention.

Figure 13:
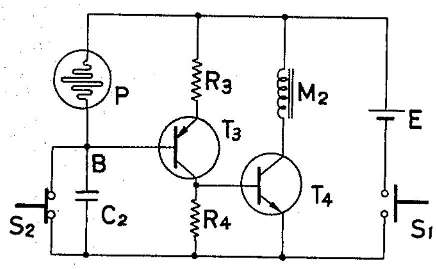

FIG. 13 is a circuit suitable for the device shown in FIG. 12, which circuit is a simplication of the circuit shown in FIG. 11.

In the embodiment shown in FIGS. 1 – 6 a charge disc 2 and a release disc 3 are provided on an axle 1 in such a manner that each one of the discs can rotate separately, and ends 4*a* and 4*b* of a coil spring 4 used for charging are secured to the discs 2 and 3, respectively. The charge disc 2 is connected to a film wind up mechanism (not shown in the drawings) while the release disc 3 is connected to a shutter opening and closing mechanism (not shown in the drawings). 6 is a pin planted on the charge disc 2.

A pair of stopping levers 8, 9 which effect swinging motions are provided on an axle 7 offset to one side of the axle 1 in such a manner that each one of the stopping levers 8, 9 goes through an independent rotating movement. Pawls 8*a*, 9*a* are provided on the stopping levers 8 and 9, respectively and are both engagable with a projection 3*a* formed on the release disc 3. An edge portion 8*b* engagable with the projection 3*a* is provided on the stopping lever 8. One wing of the lever 8 carries a pin 10 which engages with a notch 2*a* on the charge disc 2. One end of an engaging lever 12, which is pivotted on an axle 11, engages with an outer edge of the lever 8, and a pawl 12*a* engaging a governor 13 which rotates with a film winding up mechanism is formed at the engaging lever 12. The engaging lever 12 is elastically biased in a counter-clockwise direction by a spring 14.

A release button 16 moves up and down. The button 16 is elastically biased upwards by a spring 17 fixed to the camera body at one end. Underneath a release bar 18 on the button 16, a lever 19 pivots on an axle 20. One end of the lever 19 faces a lower end of the release bar 18, while the other end of the lever 19 faces a pin 21 mounted on the stopping lever 9. The stopping lever 9 is elastically biased by a spring 23 in a counter-clockwise direction, and a stopper pin 24 is fixedly mounted on the camera body underneath the lever 19.

Another engaging lever 26 for the governer 13 is pivoted on an axle 25. This engaging lever 26 engages the release bar 18 through a spring 27 connecting the engaging lever 26 and the release bar 18 and a projection 28 on the release bar 18 which contacts a lower portion of an end of the lever 26. A change-over pin 29 for successive photography is movable up and down in engagement with the upper side of the engaging lever 26 for changing the lever 26 between an operative or non-operative position.

The pin 6 on the charge disc 2 is long enough so that it engages the projection 3*a* on the release disc 3 but not long enough to engage the pawls 8*a* and 9*a*.

Although the above device is operative with the above-mentioned construction, preferable operation of the device is obtained with the following additional structure shown in the drawings. The addition device comprises a delaying device for delay the starting time of the shutter actuation.

Figure 1:
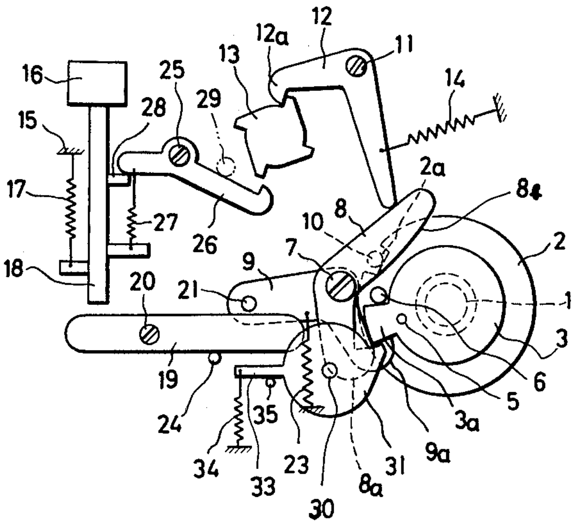
FIG. 1 is a front elevation of one embodiment of the device according to the present invention with an intermediate member in a charged state.

Particularly referring to FIG. 1, a delay disc 31 having a pawl 32 rotatable on an axle 30 is positioned so that the pawl 32 engages the projection 3*a* of the release disc 3. A projection 33 extending ourwardly from the delay disc 31 is biased in a counter-clockwise direction, by a spring 34 against a stopper pin 35 for preventing excessive movement of the delay disc 31.

The device operates as follows. In a charged state, as shown in FIG. 1, only the pawl 9*a* of the stopping lever 9 engages the projection 3*a*. The spring 4 preserves energy in its twisted state, while the pin 10 engages the notch 2*a* of the charge disc 2 with the pawl 8*a* not engaging the projection 3*a*. The pawl 12*a* of the engaging lever 12 engages the governer 13 biased by the spring 14. When the button 16 is pressed down in this state, the lower end of the release bar 18 presses one end of the lever 19, and the other end of the lever 19 presses the pin 21 upwardly. The stopping lever 9 then rotates in a clockwise direction against the tension of the spring 23. Thus the pawl 9*a* is disengaged the projection 3*a*, and the release disc 3 is made to rotate in a counter-clockwise direction by the spring 4. On the other hand, in the course of lowering the release bar 18 the spring 27 pulls one end of the engaging lever 26 to rotate it in a counterclockwise direction, thus engaging it with the governer 13.

In case the delay device is provided, as shown in FIG. 4a, when the release disc 3 is ready to be rotated, the projection 3a pushes the pawl 32 of the delay disc 31 so that the delay disc 31 rotates in a clockwise direction against the tension of the spring 34, and thus the top of the pawl 32 engages frictionally with the projection 3*a* as shown in FIG. 4*b*. In this way the rotation of the release disc 3 is delayed. Accordingly the film wound up during the above delaying operation stops completely ready for exposure. FIG. 4*c* shows the relative positions of the delay disc and the release disc at the beginning of the shutter operation.

In both cases, where the delay device is applied and not applied, rotation of the release disc 3 actuates the shutter, and as shown in FIG. 5, when the projection 3*a* of the disc 3 engages the edge portion 8*b* of the stopping lever 8, the lever 8 is pressed by the projection 3*a* and is rotated in a counter-clockwise direction. When the projection 3*a* engages the pin 6 as shown in FIG. 6, the pawl 8*a* of the stopping lever 8 comes to a position engagable with the projection 3*a*, and at the same time the pin 10 is disengaged from the notch 2*a*, and the engaging lever 12 is pressed by the outer edge of the lever 8 and is rotated in a clockwise direction, while the pawl 12*a* is disengaged from the governer 13.

Then, as the button 16 is released the release bar 18 and the button 16 are actuated to move upwardly by the spring 17. The lever 19 and the stopping lever 9 is returned by the spring 23, having the pawl 9*a* engaged with the projection 3*a*. At the same time the engaging lever 26 is rotated in a clockwise direction by the projection 28, thus disengaged with the governer 13. Thus the device becomes ready for winding up the film.

In FIG. 6 the device is shown during the course of winding up the film.

As the film is wound up the charge disc 2 and the governer 13 rotate in a counter-clockwise direction. On the other hand as the projection 3*a* of the release disc 3 is restricted by the pawls 8*a* and 9*a*, the release disc 3 does not rotate, therefore the spring 4 is energized.

Thus, as the notch 2*a* of the charge disc 2 arrives at the position for engagement with the pin 10, the pin 10, biased by the spring 14 on the stopping lever 8, engages the notch 2*a*. On the other hand the pawl 12*a* of the engaging lever 12 engages with the governer 13, thus resuming the state shown in FIG. 1.

For conducting a successive photographing in the above-mentioned device, the button 16 is held in a pressed down state, and the pin 29 is caused to slide downwardly to a position as shown by the dotted line in FIGS. 1, 3, 5 and 6, so that the engaging lever 26 is made freed the governer 13.

Since the stopping lever 9 is held not to engage the projection 3*a*, after the charge disc 2 is rotated by winding up of the film and the pin 10 drops in the notch 2*a*, the stopping lever 8 rotates in a clockwise direction disengaging the pawl 8*a* from the projection 3*a*, then the release ring 3 rotates to actuate the shutter.

As has been explained above, as the film is wound up the shutter is immediately actuated, thus a successive photographing can be made.

While the stopping lever 8 engaging the discs 2, 3 and the engaging lever 12 engaging the governer 13 are shown to be as separate units, they can be made as an integral unit.

Although the stopping lever 8 engages the discs 2 and 3 by a notch pin engagement and a projection pawl engagement, and projection with pawls, such an engagement mechanism is only an example, and other engagement mechanisms may also be used. In addition, other members may be used in place of the stopping levers 8 and 9.

As explained above in the afore-mentioned embodiments, the charge disc and release disc perform a charging action and a releasing action of the shutter only through their own rotation one after the other in one direction. That is, the shutter is actuated by rotating mechanism, therefore no undue shock will appears on any part of the camera and at the same time the shutter may be successively actuated with a simplified construction, thus successive photography may be achieved easily.

The coil spring 4 may be modified to any of other intermediate members being energized and dienergized respectively during the charging and releasing of the shutter mechanism. The release member and the charge member may be modified to any other than the members of the disc type.

Figure 2:
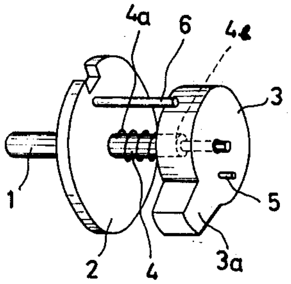
FIG. 2 is a slant view of the main part of the device shown in FIG. 1.
Figure 3:
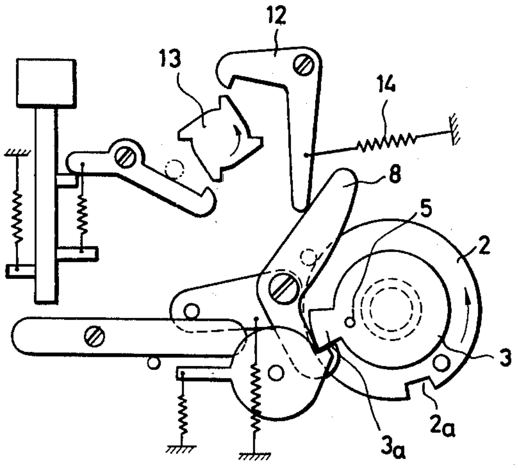
FIG. 3 is a front elevation of the intermediate member in a charging state.

Another embodiment having a rotating mechanism controlled by an electronic circuit with a main part as shown in FIG. 2 will be described both for effecting a single frame photography and a continuous photography.

In this modification, the delay device is substituted with a delay device comprising a delay circuit and a magnet controlling by the delay circuit.

An electronic timer circuit with photo-sensitive elements for determining a shutter speed is provided for maintaining the shutter full open for an appropriate period of time.

A pawl 107*a* of a release lever 107 engages a projection 103*a* of a release disc 103, and a coil spring 104 is energized in a twisted state.

A switch arrangement S5 has contact switches S5*b* and S5*a*, of which contact switch S5*b* engages a notch 102*b* provided on a charge disc 102, to open the switch 55*b*. A contact switch S3 is pushed open on its S3*b* side by an arm 102*a*.

The device in this state is ready for taking a picture. When the release lever 109 is pushed downwardly, the contact switch S4a is first opened, the contact switch S1 is opened next and lastly the contact switch S5*a* is opened.

The above operation is further explained in reference to FIG. 11.

When the contact switch S4 is opened the power from a power source E is not supplied to a motor M, and then after the contact switch S1 is closed, both of the delay circuit and the timer circuit are activated. As switching transistors T1, T2, T3 and T4 are not conductive, electromagnets M1 and M2 are not supplied with current, and thus electromagnets M1 and M2 are not energized.

In this state, when the contact switch S5 is opened, a potential at a connecting point A gradually increases through a delay circuit with a resistor R0 0 and a capacitor C1. After a predetermined time, the transistors T1 and T2 are inverted to a conductive state so that current passes through the magnet M1. Thus the magnet M1 attracts the release lever 107 against the spring 110. Thus the release lever 7 rotates in a clockwise direction, and the pawl 107*a* of the lever 107 disengages from the projection 103*a*, and the release disc 103 brings the shutter mechanism into an opened state through its rotation in a counter-clockwise direction by the spring 104.

For opening the shutter, the pin 105 on the release disc 103 engages a driving lever 105*a* through a pin-slot engagement.

On the other hand, as a pawl 108*a* of a shutter speed controlling lever 108 is positioned in a middle portion, which corresponds to a full open position for the shutter of the path of the projection 103*a*, the release disc 103 is prevented from further rotation by the controlling lever 108. At this stage, the projection 103*a* opens the contact switch S2, and thus the device gets into a state as shown in FIG. 8. A potential at a connecting point B of the timer circuit having a photoresistor P and a capacitor C2 as shown in FIG. 11 increases gradually after the contact switch S2 is opened. After a certain time responsive to the resistance value of the photoresistor P, namely the brightness of an object, the potential at the connecting point B reaches a predetermined value, and thus the transistors T3 and T4 are inverted to an "on" state, and current passes to the magnet M2. The magnet M2 attracts the controlling lever 108 against a spring 111. Therefore, the controlling lever 108 rotates in a clockwise direction, and the pawl 108*a* of the lever 108 disengages from the projection 103*a*, and the release disc 103 rotates in a counter-clockwise direction by the spring 104 to close the shutter. The contact switch S2 is again closed for resetting the timer circuit when the projection 103*a* passes over, and thus current supply to the magnet M2 is interrupted so that the magnet M2 stops action of the controlling lever 108. Thus the controlling lever 108 is rotated in a counter-clockwise direction by the spring 111, and then the pawl 108*a* again gets into the path of the projection 103*a*.

A projection 103*b* of the release disc 103 pushes the arm S3*a* of the contact switch S3 immediately after the closing of the shutter. Thus the contact switch S3 is closed and the projection 103*a* engages a pin 106 to prevent the rotation of the release disc 103. In this state, as shown in FIG. 9, the contact switches S1, S2 and S3 are closed and the contact switches S4 and S5 are opened, and thus the magnet M1 is energized to attract the release lever 107. When the release bar 109 is released at this state, the lever 109 returns back by a spring 112. In the course of releasing of the release bar 109, the contact switch is closed first, and immediately the current supply to the magnet M1 is interrupted, thus stopping the sttraction of the release lever 107 so that the release lever 107 is rotated in a counter-clockwise direction by a spring 110, and the pawl 107*a* gets into the path of the projection 103*a*. Then the contact switch S1 is opened and lastly the contact switch S4 is closed to start the film winding and the shutter charging. When the shutter charging starts, the charge disc 102 and the release disc 103 start to rotate in a counter-clockwise direction, but during this rotation, the projection 103*a* of the release disc 103 engages the pawl 107*a* of the release lever 107 as shown in FIG. 9, thus preventing the rotation of the disc 103 so that only the charge disc 102 continuous to rotate in a counter-clockwise direction. Then, after the projection 102*a* is disengaged with the arm S3*b* of the contact switch S3, the projection 103*b* is disengaged with the arm S3*a* of the contact switch S3. As the device is constructed in a manner as above, the contact switch S3 is maintained in a closed state, thus the motor M continues to rotate. In this way the shutter charging is finished, and the device is reset to the initial condition for next operation as shown in FIG. 7.

During the rotation of the charge disc 102, when the projection 102 opens the contact switch S3*b*, the switch S3 is opened and the motor M stops rotating. During this process the film winding and the shutter charging are completed.

In this way, single frame picture taking is effected.

To take pictures successively, the contact switch S4*b* of the switch S4 is closed beforehand, and the shutter release bar 109 is maintained in a pushed-down state so that the release disc 103 is rotated and the shutter release is finished. Thus, as shown in FIG. 9, just when the contact switch S3 is closed, the motor M starts to rotate for winding the film and charging the shutter. At this stage the contact switch S5*b* of the switch means S5 is disengaged with the notch 102*b* of the charge disc 102, and the switch means S5 is closed by the circumference of the disc 102, so that the magnet M1 releases the attraction of the release lever 107. Thus the pawl 107*a* gets into the path of the projection 103*a* to bring the spring 104 into an energizable state.

The film winding, namely, the shutter charging proceeds, and immediately before the completion of the film winding, the contact switch S5*b* of the switch S5 engages with the notch 102*b* of the charge disc 102. In this way, when the switch means S5 is opened, the potential at the point A in FIG. 11 increases gradually, and after a predetermined period of time, the transistors T1 and T2 are inverted to an "on" state. Thus current passes to the magnet M1 and the magnet M1 attracts the release lever 107 for releasing the shutter. In this way, if the contact switch S4 is maintained in a closed state a successive photography is effected by pushing down the shutter release bar 109. As clearly understood from the above description of the present invention, the charge disc and the release disc actuate alternatively switching means such as the shutter speed controlling switch, the motor deriving switch, the shutter releasing switch and levers such as the release lever, and the controlling lever by their own rotation in one direction so that no undue shock is implied on the camera parts and yet the shutter is suitable for a successive photographing becuase the shutter is controlled by a rotary mechanism.

The embodiment of the present invention where the delay device having an electronic delay circuit is employed for delaying the starting time of the shutter, assures that the film wind up stops completely and is maintained in a stable state without waving even during successive picture taking with a very high shutter speed.

An embodiment shown in FIGS. 12 and 13 is a simplified but complete shutter control device with an automatic shutter speed control only for a single frame photographing without a delay device. In FIG. 12 and 13, 201 is an axle and 202 is a charge disc with a notch 202*a*, and a projection pin 206. 203 is a release disc with a projection 203*a* and a short pin 205. 204 is a spring. A driving lever 205*a* engages with the pin 205 in a pin-slot engagement. 207 is a release lever and 208 is a shutter speed control lever. 209 is a release bar and 210, 211 and 212 are springs. 213 is an engaging lever.

S1 is a main switch, S2 is a start switch for shutter operation. M2 is an electromagnet, T3 and T4 are transistors. P is a photo-resistor and C2 is a capacitor. E is a power source.

Functional explanations of the last embodiment shown in FIGS. 12 and 13 are omitted because similar functions as in the other embodiments are obtained in the last embodiment.

What is claimed is:

1. A shutter operating device for a camera with a film winder, comprising shutter actuating means operative through a cycle for operating a shutter, said cycle having first and second operating positions, shutter cocking means movable through a second cycle while the film winder winds film, said second cycle having first and second functional positions, energy storage means responsive to operation of said cocking means for storing energy and connected to said actuating means for applying energy to said actuating means; control means connected to said shutter actuating means and said cocking means for holding said actuating means in the first operating position and for releasing said actuating means when said cocking means reaches said first functional position, and for maintaining said cocking means in the second functional position and moving said cocking means when said actuating means reaches the second operating position; shutter release means connected to one of said actuating means and said control means for normally holding said actuating means and for releasing said actuating means in response to operation of said release means by an operator, said shutter release means including selection means having two selection conditions, said selection means in one condition holding said actuating means each cycle, said selection means in the other condition holding said actuating means only after the operator stops operating said release means, said cocking means is moved during winding and said energy storage means moves said actuating means in the same direction as said cocking means, and means for delaying rotation of said actuating means in the first position of said cycle, said delay means comprising an engaging member engaged with said actuating means when said cycle is in said first position, said actuating means behing delayed by said delay means after releasing said actuating means which thereafter actuates the shutter to open and close during the directional rotation thereof.

2. A device as in claim 1, wherein said cocking means includes a rotary member and said actuating means includes a rotary member coaxial with said cocking means, and wherein said cocking means is moved in one rotary direction during winding and said energy storage means moves said actuating means in the same rotary direction as said cocking means.

3. A device as in claim 1, wherein said cocking means includes a rotary member and said actuating means includes a rotary member coaxial with said cocking means, and wherein said energy storage means includes a spring connecting the rotary member of said cocking means with the rotary member of said actuating means.

4. A device as in claim 3, wherein said cocking means is moved in one direction during winding and said energy storage means moves said actuating means in the same direction as said cocking means.

5. A device, as in claim 1, wherein said delay means includes a delay circuit.

6. A device, as in claim 1, wherein said actuating means includes shutter speed regulating means.

7. A device, as in claim 6, wherein said shutter speed regulating means includes an electric timer circuit.

8. A device as in claim 7, wherein said timer circuit includes a photo-sensitive element responsive to ambient light.

9. A device as in claim 5, wherein said shutter speed regulating means includes stopping means for hindering the operation of said actuating means during its cycle when the shutter is at a full open position.

10. A shutter operating device for a camera as in claim 1, wherein said delay means comprises a mechanical delay mechanism engaged with said shutter actuating means at the beginning of the operation thereof for retarding its operation during a delay period.

11. A device as in claim 1, wherein said cocking means is moved in a direction to effect relative movement with said shutter actuating means during winding, and said energy storage means moves said actuating means in the same direction.

12. A shutter operating device for a camera according to claim 9 in which said delay means comprises mechanical delay mechanism engaged with said shutter actuating means at the beginning of its operation for delaying its operation.

13. A shutter operating device for a camera according to claim 9 in which said delay means is an electronic delay means having a delay circuit and an electromagnetic means operated by the delay circuit, said electromagnetic means being arranged to hold said shutter actuating means in its starting position for a time delay before the shutter is opened.

14. A shutter operating device for a camera according to claim 13 in which said electromagnetic means is associated with said shutter release means for releasing the shutter.

15. A shutter operating device for a camera with a film winder, comprising shutter actuating means operative through a cycle for operating a shutter, said cycle having first and second operating positions, shutter cocking means movable through a second cycle while the film winder winds film, said second cycle having first and second functional positions, said actuating means rotating in one direction during said first and second cycles, said shutter cocking means being capable of rotating in the same direction to effect one cycle of operation for the shutter opening and closing, energy storage means responsive to operation of said cocking means for storing energy and connected to said actuating means for applying energy to said actuating means; control means connected to said shutter actuating means and said cocking means for holding said actuating means in the first operating position and for releasing said actuating means when said cocking means reaches said first functional position, and for maintaining said cocking means in the second functional position and moving said cocking means when said actuating means reaches the second operating position; and shutter release means connected to one of said actuating means and said control means for normally holding said actuating means and for releasing said acutating means in response to operation of said release means by an operator, said control means including a first retaining member movable into the path of said cam on said actuating means and a second retaining member movable into the path of said cam on said cocking means, articulation means pivotable about a point and carrying said first and second retaining means, said cam on said actuating means moving said articulation means out of the path of said cocking means when said actuating means reaches a given position and simultaneously moving the first retaining means into the path of the cam in said actuating means, said articulation means moving said second retaining means into the path of said cam on said cocking means when said cocking means reaches a given position and releasing said actuating means.

16. A shutter operating device for a camera, comprising shutter actuating means operative through a cycle for operating a shutter, said cycle including first and second operating positions, shutter cocking means movable through a cycle having first and second functional positions with winding of film in the camera, energy storage means responsive to operation of said cocking means for storing energy and connected to said actuating means for applying energy to said actuating means; control means connected to said shutter actuating means and said cocking means for holding said actuating means in the first operating position and for releasing said actuating means when said cocking means reaches the first functional position, and for maintaining said cocking means in the second functional position and moving said cocking means when said actuating means reaches the second operation position, and release means connected to one of said actuating means and for releasing said actuating means in response to operation of the release means by an operator, said cocking means including a rotary cam and said actuating means including a second rotary cam coaxial with the first rotary cam, said first and second rotary cams rotating in the same direction, articulating means movable into the path of either said cam on said actuating means or said cam on said cocking means so that movement of each of said cams to predetermined positions moves said articulation means out of the path of the other of said cams into its own path.

17. A device, as in claim 16, wherein electrical switching means respond to movement of one of the cams to a given position by actuating the other of the cams and stopping its own movement.

18. A device, as in claim 17, wherein said cams each include raised portions and recessed portions for opening and closing switches on the surfaces of the cams.

19. A shutter operating device for a camera comprising shutter means operative through a cycle and including a rotary cam for operating a shutter; shutter cocking means movable through a cycle during winding of film in the camera, the cocking means including another rotary cam coaxial with said cam rotating in the same direction as said the first rotary cam; energy storage means responsive to the operation of said cocking means for storing energy and connected to said actuating means for applying energy to said actuating means; control means including a first retaining member movable into the path of said cam on said actuating means and a second retaining member movable into the path of said cam on said cocking means, articulation means pivotable about a point and carrying said first and second retaining means, said cam on said actuating means moving said articulating means out of the path of said cocking means whne said actuating means reaches a position finishing opening and closing of the shutter and simultaneously moving the first retaining means into the path of the cam in said actuating means, said articulation means moving said second retaining means into the path of said cam on said cocking means when said cocking means reach a wound up position and releasing said actuating means; shutter release means connected to one of said actuating means and said control means for normally holding said actuating means and for releasing said actuating means in response to operation of the release means by an operator.

* * * * *